United States Patent

[11] 3,626,913

| [72] | Inventor | Jorma O. Sarto<br>Orchard Lake, Mich. |
|---|---|---|
| [21] | Appl. No. | 27,553 |
| [22] | Filed | Apr. 13, 1970 |
| [45] | Patented | Dec. 14, 1971 |
| [73] | Assignee | Chrysler Corporation<br>Highland Park, Mich.<br>Original application Mar. 17, 1969, Ser. No. 807,785, now Patent No. 3,542,003. Divided and this application Apr. 13, 1970, Ser. No. 27,553 |

[54] EXHAUST VELOCITY CONTROL OF EXHAUST RECYCLING
5 Claims, 4 Drawing Figs.

| [52] | U.S. Cl. | 123/119 A |
| [51] | Int. Cl. | F02m 25/06 |
| [50] | Field of Search | 123/119 A |

[56] References Cited
UNITED STATES PATENTS

| 1,541,583 | 6/1925 | Merz | 123/119 A |
| 1,698,099 | 1/1929 | Kingston | 123/119 A |
| 1,766,670 | 6/1930 | Moore | 123/119 A |
| 1,766,673 | 6/1930 | Moore | 123/119 A |
| 1,768,854 | 7/1930 | Moore | 123/119 A |
| 2,408,846 | 10/1946 | Golden et al. | 123/119 A |

*Primary Examiner*—Wendell E. Burns
*Attorney*—Talburtt and Baldwin

ABSTRACT: Automobile exhaust gases are recycled by means of a restricted bypass conduit having an upstream end comprising a pitot opening exposed to the velocity flow of exhaust gases and having a downstream end discharging into the fuel and air inlet system, such that the bypass flow of exhaust gases into the inlet system is a function of engine load. The downstream end may also comprise a pitot-type opening exposed to the velocity pressure of the inlet flow at wide open throttle and being increasingly shielded by the customary throttle valve as the latter closes from the wide open position.

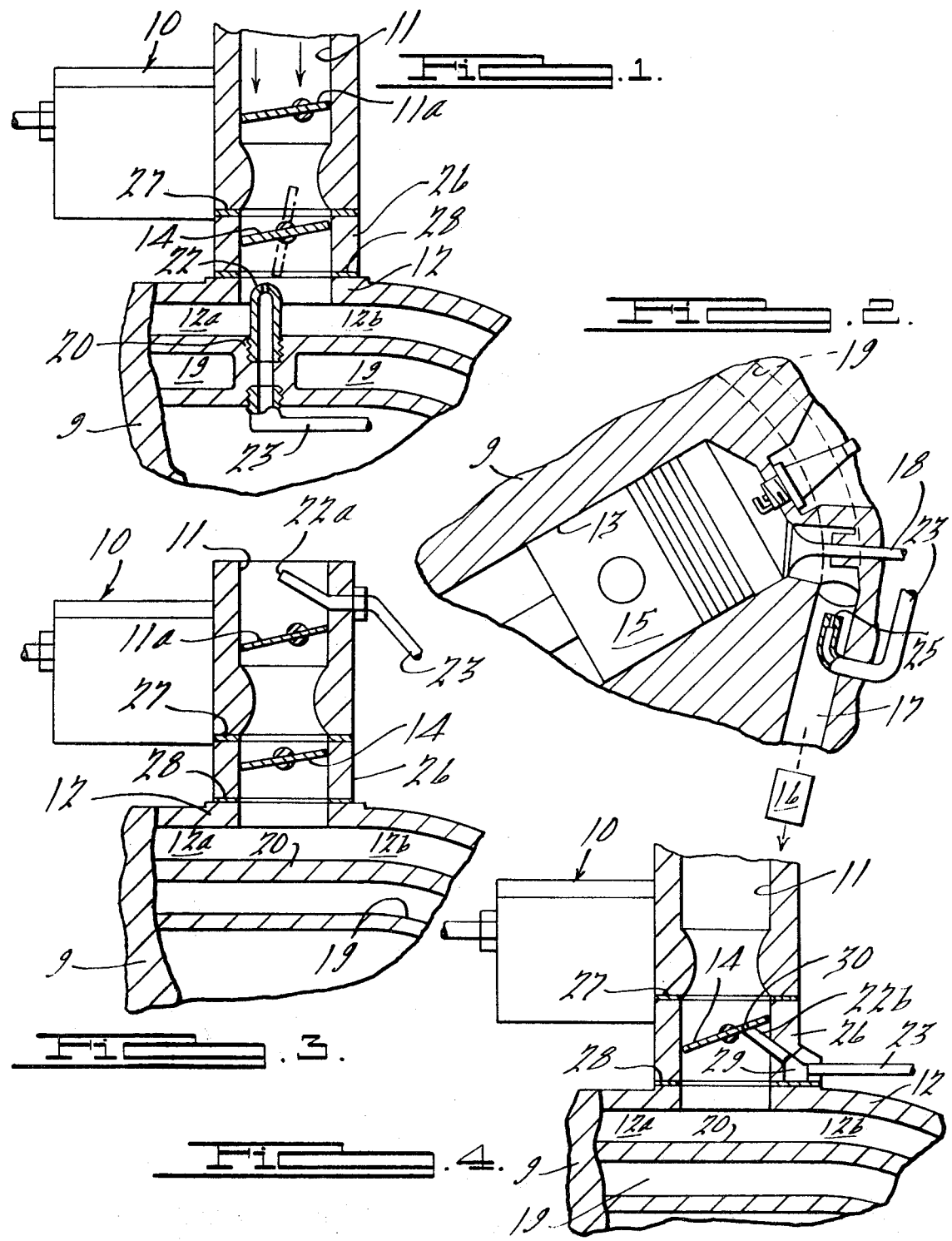

3,626,913

EXHAUST VELOCITY CONTROL OF EXHAUST RECYCLING

RELATED APPLICATION

This application is a division of my copending application Ser. No. 807,705, filed Mar. 17, 1969 now Pat. No. 3,542,003.

BACKGROUND AND SUMMARY OF THE INVENTION

In the prior art, numerous systems have been devised to recycle exhaust gas into the fuel-air induction system of an automobile engine for the purposes of preheating and vaporizing the incoming air-fuel mixture to facilitate its complete combustion in the combustion zone, for reusing the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate speeds to substantially reduce the nitrogen oxide content of the exhaust gases discharged in the atmosphere, that is, to below about 1,000 parts per million.

Although the prior art structures have had the desired effect of reducing the content of nitrogen oxides in the exhaust by reducing the maximum combustion temperature in consequence of diluting the fuel-air mixture with recycled exhaust gases during certain operating conditions of the engine, these structures have not been commercially acceptable from the standpoint of both cost and operating efficiency and have been complicated by the desirability of reducing the recycling during conditions of both engine idling when nitrogen oxide emission is a minor problem, and wide open throttle when maximum power is required, while progressively increasing the recycling of exhaust gases with increasing engine load during cruising conditions or with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200° F. The formation of nitrogen oxides does not become particularly objectionable until the combustion temperature exceeds about 2,200° F., but the usual engine combustion temperature which increases with engine load or the rate of acceleration at any given speed frequently rises to about 2,500° F. It is known that the recycling of at least one-twentieth and not more than one-fourth of the total exhaust gases through the engine, depending on the load or power demand, will reduce the combustion temperature to less than 2,200° F. The desired result is usually obtained with the ordinary engine upon the recycling of about 15 percent of the total exhaust gases during partially open throttle as aforesaid.

An important object of this invention is to provide improved means uncomplicated by moving parts comprising a restricted recycling or bypass duct for recirculating a portion of the combustion products from the exhaust system to the inlet system of an automobile engine, which overcomes or avoids the problems and deficiencies of the prior art, as well as achieves a number of important results including preheating and improved mixing and carburetion of the fuel-air mixture in the inlet header, the reduction of ice formation at the customary throttle blade, and the reduction of nitrogen oxides in the exhaust.

Another object is to provide such an exhaust recycling system wherein the upstream end of the bypass duct comprises a pitot type opening exposed to the velocity flow of the exhaust gases within the exhaust system. The downstream end of the bypass duct also comprises a pitot type opening at a location exposed to the velocity pressure of the inlet flow at wide open throttle conditions and increasingly shielded by the throttle valve from the inlet flow as the throttle valve moves to its idle position from the wide open position. Thus the bypass duct will discharge exhaust gases against an oppositely directed stream of inlet gases when the throttle valve opens from its idle operating position. During engine idling when the pressure differential between opposite ends of the bypass duct is slight, the bypass flow of exhaust gases will be nominal. Likewise during wide open throttle operation when the downstream pitot opening is exposed fully to the inlet flow, the exhaust recycling is opposed and again may be nominal. In fact, where desired, the flow in the bypass duct may be reversed at wide open throttle to conduct a fuel-air mixture into the exhaust conduit to facilitate combustion of the exhaust gases in the afterburner. The angular relationships of the upstream and downstream pitot openings of the bypass duct and the latter's fixed restriction are arranged and dimensioned so that more than 5 percent but less than approximately 25 percent and usually about 15 percent of the total exhaust gases are conducted through the bypass duct into the inlet conduit when the throttle is partially open and the effective pressure differential between its ends corresponds to cruising or part open throttle acceleration conditions.

By virtue of the foregoing, communication will exist at all times between the exhaust and inlet systems and a portion of the hot exhaust gases may be directed against the throttle valve to prevent or minimize carburetor icing during fast idling of a cold engine when ice formation is most likely to occur. During cold engine idling when the throttle is held partially open by the usual fast idle cam during this condition, the flow of hot exhaust gases against the throttle blade will increase, as compared to normal warm idling, because the increased engine speed at fast idle will increase the exhaust pressure with respect to the inlet induction conduit pressure.

In addition, within the range from idle to light or moderate load conditions, the total fluid flow through a fixed bypass or recycling orifice of the type comprising the present invention increases at any given engine speed with increasing engine load. For example in a conventional automobile engine, the pressure downstream of the throttle varies roughly in the neighborhood of from ½ atmosphere during idling to approximately 1 atmosphere at wide open throttle, while the exhaust pressure simultaneously varies roughly from 1 to 2 atmospheres. These factors compensate for the increasing combustion temperature with increasing load and result in a desirable increase in the effectiveness of the exhaust recycling through the fixed bypass restriction with increasing load or acceleration.

As the engine load or acceleration decreases and the speed increases to the cruising condition, the combustion temperature and the pressure differential across the fixed bypass restriction, as well as the total quantity of exhaust gases, decrease and the rate of exhaust recycling declines for improved fuel economy, again as desired because less recycling is required to maintain the combustion temperature below the level at which nitrogen oxide formation is objectionable. As the pressure differential between the inlet and exhaust headers increases with increasing load, the effective resistance of the fixed restriction to the recycling flow increases because the flow rate varies approximately as the square root of the pressure differential. Thus at wide open throttle, even without recourse to a flow opposing pitot opening at the downstream end of the bypass duct, the proportion of the total exhaust gases that is recycled is somewhat less than the proportion recycled at partially open throttle. This factor also is as desired because the customary excess fuel enrichment at wide open throttle in cooperation with the recycled exhaust gases is adequate to prevent overheating during the combustion process and reduce the formation of nitrogen oxides to the tolerable level.

Another object is to provide such a construction wherein the bypass duct extends in heat exchange relationship through the customary throttle body of the inlet system and terminates within the induction conduit in a nozzle directed to discharge hot exhaust gases upstream against the flow of the fuel-air mixture in the induction conduit and also against the usual throttle valve, thereby to provide simple, economical and effective means for accomplishing the above-mentioned objects as well as for preheating the throttle body and simultaneously cooling the exhaust gases in the bypass conduit below the fuel ignition temperature, and for diluting the fuel-air mixture with substantially incombustible exhaust gases to lower the combustion temperature in the engine and thereby reduce the formation of nitrogen oxides during the combustion process.

Other objects are to provide the restriction for the bypass duct adjacent its upstream end, as for example at its communication with the exhaust system, where the accumulation of deposits from the exhaust is minimized.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGS. 1, 3 and 4 are schematic fragmentary cross-sectional views through three different automobile engine induction systems showing three embodiments of the downstream ends of the exhaust bypass duct.

FIG. 2 is a similar view showing the upstream end of the bypass duct.

It is to be understood that any one of the downstream ends of the bypass conduit shown in the aforesaid views can be employed with the upstream end, the desired amount of exhaust recirculation during different engine operating conditions being obtained by predetermining the dimensional and angular relationships of the cooperating parts, including the pitot openings in the exhaust and inlet systems and the locations of the bypass duct restriction and the upstream and downstream openings of the bypass duct into the exhaust and inlet systems respectively.

DESCRIPTION OF THE PREFERRED EMBODIMENTS

Referring to the drawings, particularly FIGS. 1 and 2, an application of the present invention is illustrated by way of example with an automobile engine 9 having a carburetor 10 providing the inlet fuel-air induction conduit 11, which comprises the upstream portion of an inlet header 12 for supplying a combustible fuel and air mixture to the engine cylinders 13. The carburetor 10 may comprise any conventional type which has the usual air inlet at the upstream end of the induction conduit 11, the usual fuel metering system and nozzles or jets for supplying idle and operating fuel to the conduit 11 during various operating conditions and for enriching the fuel supply during acceleration and wide open throttle, and the usual automatic choke (including choke valve 11a) and thermostatic means for controlling idle enrichment and fast idle operation during cold starting conditions. An example of such a carburetor is illustrated by way of example in Ball U.S. Pat. No. 2,966,344, so that the foregoing conventional features disclosed in the latter patent are incorporated herein by reference and are not described in detail.

The downstream portion of the induction conduit 11 comprises the customary throttle body containing the conventional butterfly type throttle valve 14. The inlet fuel-air mixture is conducted via the headers or manifolds 12a and 12b, comprising extensions of the header 12, to the left and right banks of cylinders 13 respectively in timed relation with operation of the engine pistons 15. After combustion of the fuel-air mixture above the pistons 15, the exhaust gases are conducted in timed relationship with respect to the reciprocation of the pistons 15 and exhaust valves 18 to exhaust manifolds or headers 17, which may discharge through an afterburner or exhaust reactor 16 and thence through a muffler to the atmosphere. The exhaust reactor or afterburner 16 operates to complete the combustion of incompletely burned fuel before discharging the exhaust to the atmosphere, and may be supplied with additional fuel and air to facilitate combustion therein in accordance with known practice.

The left and right manifolds 17 are connected by a crossover conduit 19 which conducts the hot exhaust gases into heat exchange relationship with portion 20 of the wall of the inlet header. The wall portion 20 extends transversely to the direction of flow of the inlet mixture and is commonly referred to as the "hot spot" which preheats the inlet mixture and enhances vaporization and mixing of liquid fuel droplets. A thermostatically controlled valve 21 in one header 17 controls the flow of hot gases in the crossover conduit 19 so as to expedite heating of the hot spot 20 during the engine warm-up period and to prevent overheating during operation of the engine under load. The structure described thus far may also be conventional.

Associated with the throttle valve 14 and extending through the hot spot 20 is a nozzle 22 connected by means of a bypass or recycling conduit 23 having its upstream end in communication with the exhaust header 17 by means of a pitot type opening 25, so as to be responsive to the velocity force or pressure of the exhaust flow, as well as the static pressure of the exhaust. This arrangement is particularly suitable for trucks that usually operate at high engine load, or for small engines that seldom operate at low pressure in conduit 11. The pitot or total pressure opening 25 compensates for the higher pressure in conduit 11.

The bypass duct 23 is provided with a fixed total restriction dimensioned to enable controlled recycling of a portion of the exhaust gas from exhaust conduit 17 to the inlet conduit 11. During normal cruising or part throttle acceleration, the bypass flow of recycled exhaust gases amounts to at least 5 percent and not more than 25 percent of the total exhaust gases, depending upon the specific engine and its operating conditions. In the usual situation effective reduction of nitrogen oxides in the exhaust is accomplished by recycling approximately 15 percent of the exhaust gases as aforesaid, preferably through several nozzles 22 arranged in the manner of the nozzle shown where a multiple barrel carburetor is involved.

In climatic regions where icing is a problem, each nozzle 22 may be extended into proximity with its associated throttle valve 14 by means of an integral low resistance tubular stand pipe having a length depending upon the specific geometry and location of the portion of the hot spot 20 through which it extends. Each bypass conduit 22, 23 thus has the same resistance to gas flow. The flow of the hot exhaust gases through the hot spot 20 and nozzle 22 also facilitates preheating of the hot spot 20 and throttle valve 14 to assure vaporization of the inlet mixture and the prevention of ice formation adjacent the edges of the throttle valve 14. Simultaneously the recycled exhaust gases are cooled below the ignition temperature of the combustible inlet mixture. To this end the nozzle 22 is preferably of heat conducting material and is sufficiently long to achieve the necessary heat transfer from the exhaust gases to the hot spot and inlet mixture. Also by directing the exhaust gases directly in opposition to the flow of the inlet mixture, improved breaking up, dispersion and vaporization of liquid fuel droplets are achieved with consequent improved mixing of the combustible inlet gases and uniform predictable combustion characteristics within the cylinders 13.

Bypass duct 23 is shown with restrictions at both its upstream and downstream ends, although either restriction may be eliminated or rendered of minor importance with respect to the other, depending on the operating characteristics of the engine and to a large extent, the type of fuel supplied to the engine. For fuels employing lead additives to enhance combustion characteristics, the downstream restriction at the nozzle 22 will be enlarged or eliminated entirely. By virtue of the upstream restriction at pitot opening 25 in the stream of hot exhaust comparatively close to the exhaust valve 18, the lead contaminants in the exhaust will be in vapor form and will pass readily through the latter restriction without clogging the same.

With other types of fuels that produce exhaust contaminants that tend to condense from the vapor stage and collect within the bypass duct 23 as the recycling exhaust loses its heat to the hot spot 20 and sidewalls of the nozzle 22, clogging of the restriction at the comparatively cool upper tip of the nozzle 22 will be minimized and the useful life of the bypass conduit will be increased because most of the contaminants will have condensed and collected along the walls of the duct 23 and nozzle 22 before reaching the restricted upper tip. In this situation the restriction at opening 25 may be enlarged or eliminated.

A modification of the exhaust recycling system is illustrated in FIG. 3 wherein the exhaust jet is directed angularly into induction conduit 11 through nozzle 22a located upstream of the choke valve 11a, which is also upstream of the conventional fuel nozzles discharging into conduit 11. By predetermining the angle of the nozzle 22a and its restriction, a balance between static and dynamic pressures can be obtained for controlling the recycling of the exhaust gases under various engine operating conditions. The structure of FIG. 3 operates to accomplish substantially the same exhaust recycling as in FIG. 1. In both structures, the exhaust recycling during normal idle is a minimum, when the formation of nitrogen oxides during combustion is also a minimum. During partly open throttle conditions, the effective pressure differential between the exhaust pressure in header 17 and the inlet pressure in conduit 11 and the resulting rate of exhaust recycling will increase as the throttle opening increases, so as to effect the desired amount of exhaust recycling.

In FIG. 4, the upper end of conduit 23 terminates in a restricted nozzle 22b. The nozzle 22b extends through the throttle body 26 in heat transfer relationship therewith at a location between the customary gaskets 28 and 27 which serve to insulate the throttle thermally from the adjacent manifold 12 and upper portion of the conduit 11, thereby to enable controlled heating of the throttle body 26 in accordance with the extent of bypass flow or exhaust recirculation. An enlargement in the conduit 23 comprising a chamber 29 formed in throttle body 26 predetermines the throttle body surface in heat exchange relationship with the exhaust bypass flow.

The nozzle 22b is directed angularly toward and terminates adjacent the throttle valve 14 when the latter is at its idle position shown and directs a jet of exhaust gases in opposition to a jet of inlet gases flowing through a restricted opening 30 in valve 14. The opening 30 may comprise part of the idle air supply for the engine, especially during fast idle, and is dimensioned with respect to the dimensions of the exhaust bypass duct system to substantially block exhaust recirculation when the throttle valve 14 is at its idle position shown.

As valve 14 progressively opens with increasing engine load, the opposing jets from nozzle 22b and orifice 30 move out of alignment, the effective pressure differential across orifice 30 decreases, the exhaust pressure at pitot 25 increases, and the pressure differential between the upstream end of duct 23 and the discharge opening of nozzle 22b increases, all to the end of increasing the bypass flow or exhaust recirculation from header 17 into conduit 11. Also during part throttle opening, the upper open end of nozzle 22b is protected by throttle valve 14 from the dynamic or velocity pressure of the inlet gases, as may also be the case with nozzle 22, FIG. 1. At wide open throttle, dotted position, FIG. 1, the upper end of nozzle 22 or 22b is exposed to the inlet velocity flow in the manner of a pitot tube, thereby to oppose the pitot action at end 25 and reduce the exhaust recirculation or even to reverse the direction of flow in conduit 23, as described above.

I claim:
1. In an internal combustion engine,
  A. an inlet conduit for conducting a fuel-air mixture into said engine for combustion therein,
  B. a throttle valve in said inlet conduit,
  C. an exhaust conduit for discharging the combustion products from said engine,
  D. and means for effectively inhibiting the formation of oxides of nitrogen during said combustion by limiting the combustion temperature comprising a restricted bypass duct for conducting exhaust gases from said exhaust conduit into said inlet conduit and having
    1. one end opening into said exhaust conduit, and
    2. a second end opening into said inlet conduit,
  E. said inlet conduit including an intermediate throttle body having said throttle valve mounted therein,
  F. heat insulating gaskets spacing said throttle body from the adjacent upstream and downstream portions of said inlet conduit, said bypass duct having a portion contained within the sidewall of said throttle body to effect controlled heating of the latter in accordance with the bypass flow of said exhaust gases.

2. In the combination according to claim 1, the portion of said bypass duct within the sidewall of said throttle body comprises a chamber dimensioned to predetermine the throttle body surface in heat exchange relationship with the bypass flow of said exhaust gases.

3. In the combination according to claim 1, said one end of said bypass duct comprising a pitot type opening exposed to the velocity pressure of the exhaust flow to increase the pressure at said one end with increasing exhaust flow.

4. In the combination according to claim 3, said second end comprising a pitot type opening directed in an upstream direction within said inlet conduit at a location exposed to the velocity pressure of the inlet gases when said valve is wide open and being increasingly shielded by said blade from said velocity pressure as said valve closes.

5. In the combination according to claim 4, the portion of said bypass duct within the sidewall of said throttle body comprises an enlarged chamber dimensioned to predetermine the throttle body surface in heat exchange relationship with the bypass flow of said exhaust gases.

* * * * *